US009531541B2

(12) United States Patent
Beame

(10) Patent No.: US 9,531,541 B2
(45) Date of Patent: Dec. 27, 2016

(54) CRYPTOGRAPHIC STORAGE DEVICE CONTROLLER

(71) Applicant: Carl Beame, Mallow (IE)

(72) Inventor: Carl Beame, Mallow (IE)

( * ) Notice: Subject to any disclaimer, the term of this patent is extended or adjusted under 35 U.S.C. 154(b) by 0 days.

(21) Appl. No.: 14/484,648

(22) Filed: Sep. 12, 2014

(65) Prior Publication Data
US 2015/0074412 A1  Mar. 12, 2015

Related U.S. Application Data

(60) Provisional application No. 61/876,956, filed on Sep. 12, 2013.

(51) Int. Cl.
*H04L 9/32* (2006.01)
*G06F 21/62* (2013.01)
*G06F 21/34* (2013.01)

(52) U.S. Cl.
CPC .......... *H04L 9/3236* (2013.01); *G06F 21/34* (2013.01); *G06F 21/6218* (2013.01); *H04L 9/3228* (2013.01); *H04L 9/3234* (2013.01)

(58) Field of Classification Search
None
See application file for complete search history.

(56) References Cited

U.S. PATENT DOCUMENTS

| 8,086,585 B1* | 12/2011 | Brashers ........... G06F 17/30097 707/705 |
| 2006/0083228 A1 | 4/2006 | Ong et al. |
| 2008/0021577 A1 | 1/2008 | Ijichi et al. |
| 2009/0313687 A1 | 12/2009 | Popp et al. |
| 2013/0031306 A1* | 1/2013 | Kim .................... G06F 12/0862 711/113 |
| 2013/0326115 A1* | 12/2013 | Goss .................... G06F 3/0641 711/103 |

FOREIGN PATENT DOCUMENTS

| WO | WO2008/024644 | 2/2008 |
| WO | WO2008/096220 | 8/2008 |
| WO | WO2011/054044 | 5/2011 |

* cited by examiner

*Primary Examiner* — Esther B Henderson
(74) *Attorney, Agent, or Firm* — Arc IP Law, PC; Joseph J. Mayo

(57) ABSTRACT

A method of configuring a controller of a portable-computer-readable-medium for performing a cryptographic function, and a portable-computer-readable-medium configured by same, are disclosed. The portable-computer-readable-medium has memory means in which at least first and second data files are stored, each file starting at a respective Logical Block Address (LBA) of the memory means. A first code, for instance a private key, is written in the first file. A password is associated with the second file. The controller of the portable-computer-readable-medium is configured to perform a hash function upon input data to be written to the second file with the first code, write the output hash to at least the second LBA, increment the first code and write the incremented first code to the first LBA.

18 Claims, 5 Drawing Sheets

CRYPTOGRAPHIC STORAGE DEVICE CONTROLLER

This application claims the benefit of U.S. Provisional Patent Application Ser. No. 61/876,956, filed 12 Sep. 2013, the specification of which is hereby incorporated herein by reference.

BACKGROUND OF THE INVENTION

Field of the Invention

At least one embodiment of the invention relates to a cryptographic technique for use with a portable-computer-readable-medium. More particularly, at least one embodiment of the invention is concerned with configuring the controller of a portable-computer-readable-medium for cryptographic authentication.

Description of the Related Art

Most operating systems of data processing terminals support the reading of data files from, and their writing to, memory means of portable data storage devices temporarily connected to a host data processing terminal, without the need for specific reading/writing applications. A remote terminal, for instance a web server, may also read and/or write data files stored in a portable data storage device operably connected with a local data processing terminal, subject to obtaining relevant permissions from the client terminal user.

By way of example, in the context of a server system securely storing data and a client system requesting access to the data from the server, this technique is based on the server system and the client system jointly knowing a starting Private Key (PK), and the server system and the user of the client system jointly knowing a Password (PW). The password is input by the user at the client system, whereby a hash is calculated from the password and the private key, for instance using a Secure Hash Algorithm (SHA). The calculated hash is sent to the server system, which likewise hashes the known password and private key and either establishes a match, whereby access to the data is granted, or declares a mismatch, whereby access is denied.

The private key is incremented each time the client system calculates the hash from the private key and password, such that the next hash will be different to the one last sent to the server system. Accordingly, if the user inputs an incorrect password, the calculated hash will result in a mismatch at the server and denial of access, yet the private key on the client is still incremented. If a valid password is then input at the client system, the resulting hash sent to the server system still does not match the server-generated hash, at which the current private key has not been incremented, although it would match the hash calculated with the private key plus 1. Thus, the server system compares the hash received with a hash or hashes calculated with the next N (e.g. N=10) increments of the private key. Should the hash received match the next N-hash or -hashes, the server authenticates the client and updates its private key to the new value, thus re-synchronises with the client system. It will be appreciated that the system can be accomplished without the user password.

Such techniques are routinely implemented where the cryptographic information is associated with a specific data processing device, or on a portable device that requires specific software or device drivers be installed on the data processing device before it can be used. Numerous prior art systems exist such as WO2011/054044; US 2006/0083228; US2008/021577; WO2008/024644; US20090313687; and WO2008096220.

All such implementations are necessarily devised for use as OTP systems or according to the particulars of the operating system of a terminal for data processing compatibility, thus wherein a portable authentication device with a terminal operating under the Microsoft® Windows® 8 operating system may not be subsequently decrypted and read with another terminal operating under the Apple® OSX® operating system.

An improved method of portable authentication is therefore required, which mitigates at least the above shortcomings of the prior art.

BRIEF SUMMARY OF THE INVENTION

At least one embodiment of the invention provides a portable-computer-readable-medium, the embedded controller of which is configured to perform a cryptographic function upon the data written thereto as a file or files, wherein any private key or OTP key is stored in the medium from which it cannot be read. The cryptographic result can be subsequently read from the file or files by the controller, the configuring set of instructions for which is modified for the controller to intercept read and write requests from the data processing terminal to which the portable-computer-readable-medium is operably connected.

This solution advantageously overcomes any issue of operating system incompatibility between terminals sharing the portable-computer-readable-medium, and usefully allows medium data access to be authenticated by any application processed by any terminal, whether local or remote, without having to install device drivers or a cryptographic set of instructions on the terminals as most data processing terminals and operating systems already can read portable-computer-readable-medium. The solution of the invention provides applications, but not limited, to secure storage and reading of medical information records and personal credit/debit card details.

According to an aspect of at least one embodiment of the invention, there is therefore provided a method of configuring a controller of a portable-computer-readable-medium for performing a cryptographic function, comprising the steps of storing at least first and second data files in memory means of the medium, each file starting at a respective Logical Block Address (LBA) of the memory means; writing a first code in the first file; and configuring the controller to perform a hash function upon input data to be written to the second file with the first code, write the output hash to at least the second LBA, increment the first code and write the incremented first code to the first LBA.

According to an aspect of at least one embodiment of the invention, there is therefore provided a method of configuring a controller of a portable-computer-readable-medium for performing a cryptographic function, comprising the steps of storing at least first and second data files in memory means of the medium, each file starting at a respective Logical Block Address (LBA) of the memory means; writing a first code in the first file; and configuring the controller to perform, upon reading the LBA of the second file, a hash function of the first code, write the output hash to at least the second LBA, increment the first code and write the incremented first code to the first LBA.

In an embodiment of the method according to at least one embodiment of the invention, the method may include the further steps of storing a third data file in the memory means, the third file starting at a respective Logical block (LBA) address of the memory means; and further configuring the controller to write the output hash to the third LBA.

In an embodiment of the method according to the invention, the method may replace the first file with storage of the first code in memory means of the portable memory device not allocated for the file system. This can be accomplished with special IOCTL commands, In a variant of this embodiment, the method preferably comprises the further step of wear-levelling the memory means in use.

In an embodiment of the method according to the invention, the method may comprise the further step of, for any request received by the controller to read the memory means from the first LBA, by returning either blank or random data.

In an embodiment of the method according to the invention, the method may comprise the further step of configuring the controller to process only a standard read or write request and to block any other medium input/output control (IOCTL) request.

In an embodiment of the method according to the invention, the method may comprise the further step of configuring the controller to disable the cryptographic functions of the portable-computer-readable-medium after a pre-determined number of correct or incorrect attempts at performing the cryptographic function.

According to another aspect of at least one embodiment of the invention, there is also provided a portable-computer-readable-medium comprising memory means for storing data files, at least one data input/output interface for interfacing the portable-computer-readable-medium with a data processing terminal; and a controller, operably connected to the memory means and to the at least one data input/output interface. The memory means stores at least first and second data files, each file starting at a respective Logical Block Address (LBA) of the memory means, the first file containing a first code. The controller comprises hashing means for hashing input data to be written to the second file with the first code, means for incrementing the first code after hashing, and writing means for writing the hash output by the hashing means to at least the second LBA and writing the incremented first code to the first LBA.

In an embodiment of the portable-computer-readable-medium according to the invention, the memory means may store a third data file in the memory means, the third file starting at a respective Logical block (LBA) address of the memory means, and the writing means may be further for writing the hash output by the hashing means to at least the third LBA.

In a variant of this embodiment, the controller is preferably adapted to perform a wear-levelling function upon the memory means.

According to yet another aspect of at least one embodiment of the invention, there is also provided a set of instructions recorded on a data carrying medium storing at least first and second data files in memory means of the medium, each file starting at a respective Logical Block Address (LBA) of the memory means, wherein the set of instructions, when processed by a controller of the data carrying medium, configures the controller to write a first code in the first file; perform a hash function upon input data to be written to the second file with the first code; write the output hash to at least the second LBA; increment the first code; and write the incremented first code to the first LBA.

In an embodiment of the set of instructions according to the invention, the memory means may store a third data file in the memory means, the third file starting at a respective Logical block (LBA) address of the memory means, further configuring the controller to write the hash output by the hashing means to at least the third LBA.

In an embodiment of the set of instructions according to the invention, the set of instructions may further configure the controller to perform a wear-levelling function upon the memory means.

In an embodiment of the set of instructions according to the invention, the set of instructions may be embodied as firmware for the controller of the data carrying medium.

For any of the above embodiments and further variants, the first code is preferably a private key and the second code may be a password.

For any of the above embodiments and further variants, the portable-computer-readable-medium may be selected from the group comprising random access memory devices, non-volatile random access memory devices, flash memory devices, electrically—erasable programmable read-only memory devices, optical data storage devices, magnetic data storage devices and networked data storage arrays and portions thereof. In a typical embodiment, the memory means is a NAND memory.

For any of the above embodiments and further variants, the data processing terminal may selected from the group comprising computers, portable computers, tablet computers, mobile telephone handsets.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to at least one embodiment of the invention with reference to the accompanying drawings in which.

DETAILED DESCRIPTION OF THE INVENTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
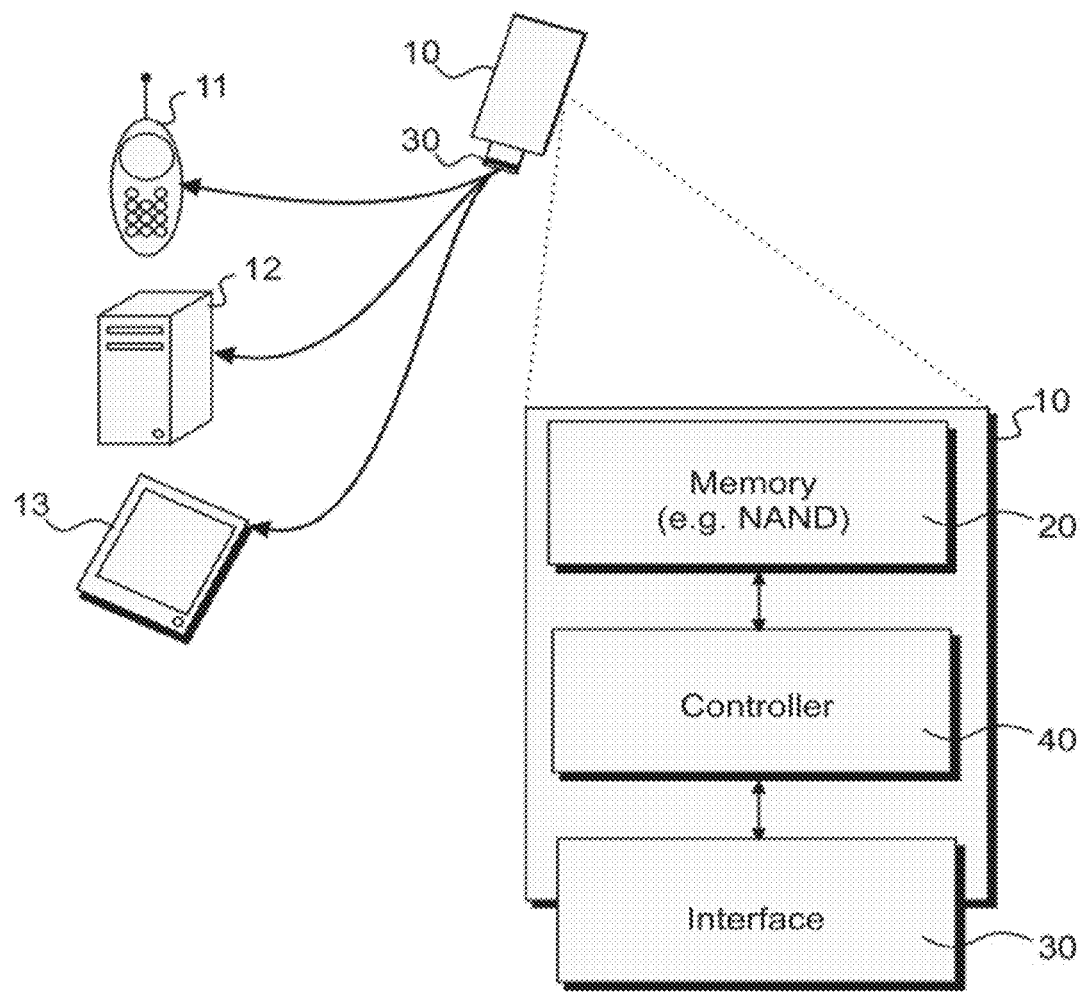
FIG. 1 is a logical diagram of a typical hardware architecture of a portable-computer-readable-medium for writing data thereto and reading data therefrom with a data processing terminal, including a controller and memory means.

With reference to FIG. 1 herein, portable storage devices 10 are typically, but not exclusively, memory sticks or memory cards 10 with memory means 20 and can be connected to a data processing terminal such as a mobile telephone 11, computer 12 or tablet device 13 on an ad hoc basis, via a standardised hardware interface 30 like a Universal Serial Bus (USB), Secure Digital (SD), Multi Media Card (MMC) or other interface, connectable to a respective and corresponding hardware interface of the host terminal.

Every storage device 10 includes a controller 40 located between the memory means 20, for instance a NAND memory, and the hardware interface 30. This controller 40 receives and interprets input and output requests from the operating system of the connected terminal via the interface 30, and replies to each read or write request in relation to the memory means 20.

Figure 2:
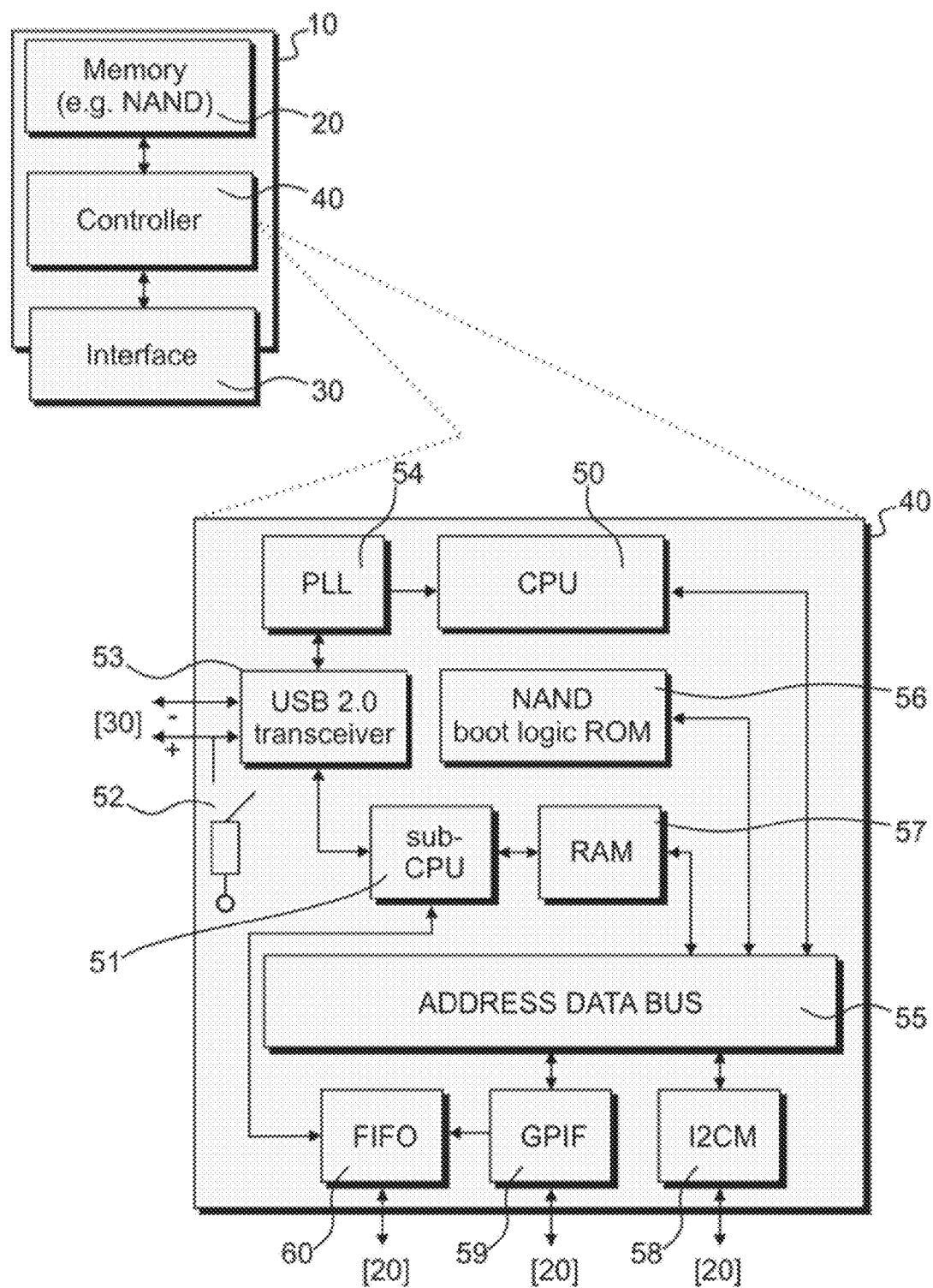
FIG. 2 is a logical diagram of a typical hardware architecture of a portable-computer-readable-medium controller shown in FIG. 1.

With reference to FIG. 2 herein, the controller 40 typically comprises a core processor 50 associated with ancillary control circuitry. The circuitry firstly includes components governing the read/write performance of the storage device, in terms of data volume read or written per second, in dependence on the characteristics of the host terminal and interface. In the example, the core processor is operably interfaced with an enhanced USB sub-processor 51, a voltage switch 52 selecting full or high speed USB bandwidth and an integrated full or high speed transceiver 53 to which the hardware interface 30 is connected. Both the CPU and the transceiver obtain timing signals from a Digital Phase Locked Loop (PLL) timing module 54.

The circuitry also includes components governing the configuration and read/write parameters of the memory 20. In the example, the core processor 50 is interfaced with a memory address bus 55, which operably connects it to a read-only memory chip 56 storing boot logic for the NAND memory 20. The memory address bus 55 also connects the core processor 50 to a small memory module 57 which stores its configuring instructions, i.e. its firmware and through which firmware updates may be performed. The memory module 57 may also store configuring instructions for the enhanced USB sub-processor 51, to which it is also connected. The memory address bus 55 is interfaced with the NAND memory 20 through an Inter-Integrated Circuit (I2C) addressing module 58, a General Programmable Interface (GPIF) module 59 and a First-In-First-Out buffer module 60, wherein the FIFO module 60 is also addressable by the enhanced USB sub-processor 51.

It will be readily understood by the skilled person from the foregoing, that the USB device 10 of FIGS. 1 and 2 is provided herein by way of example only, and that it may be functionally substituted with any other random access memory device, non-volatile random access memory device, flash memory device, electrically—erasable programmable read-only memory device, optical data storage device such as a re-writable CD, magnetic data storage device such as a floppy disk or data card, and a networked data storage array or a portion thereof such as a network drive.

Figure 3:
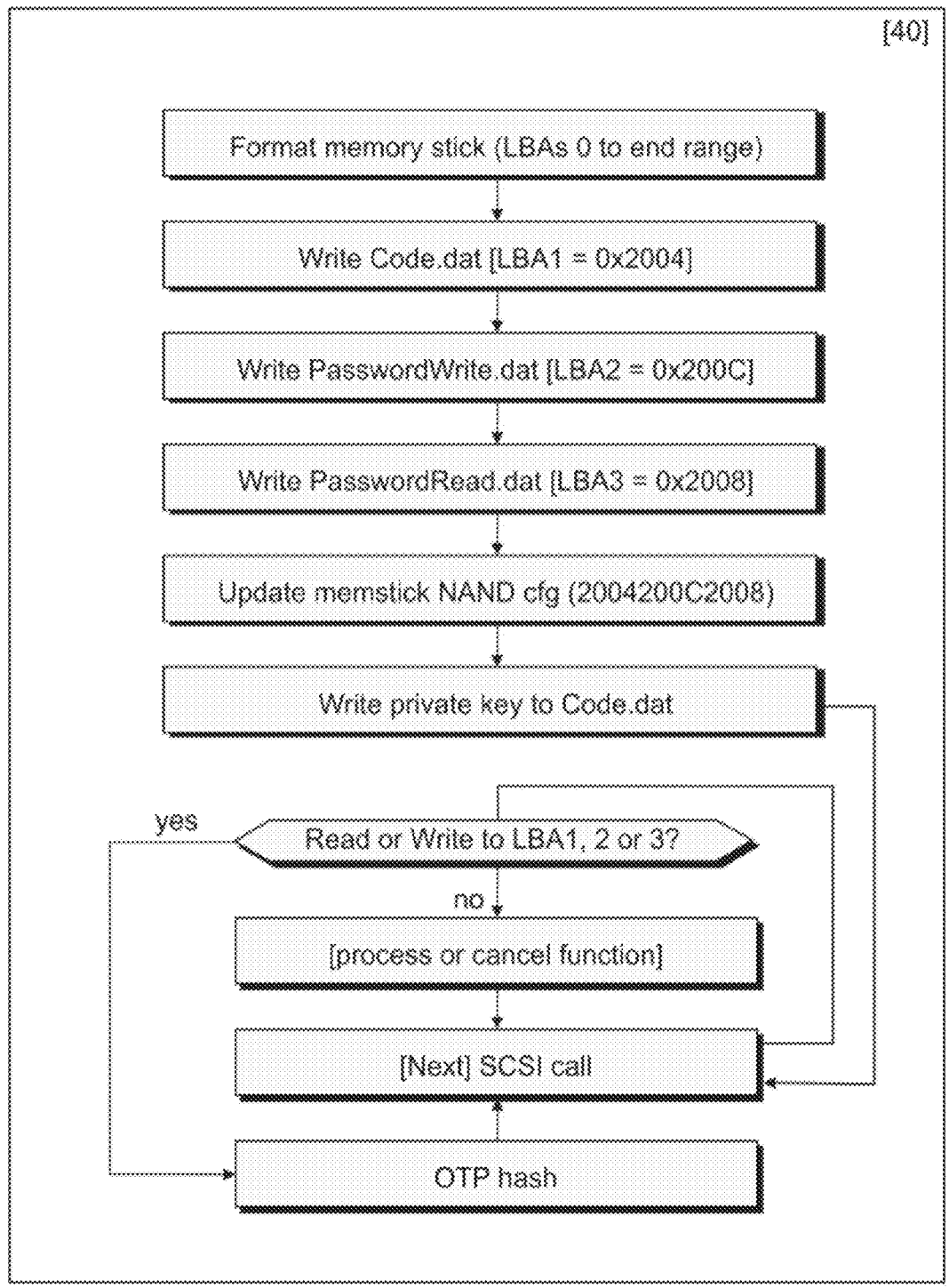
FIG. 3 is a flowchart representation of an embodiment of the method of configuring the controller of FIGS. 1 and to 2 to perform a cryptographic function.

With reference to FIG. 3 herein, the present invention provides a method of configuring the controller of a portable-computer-readable-medium for performing a cryptographic function. An embodiment of the method is described hereafter for configuring the controller 40 of the USB memory stick 10 to act as a One Time Password authentication device using a first code, in the example a shared counter, and a second code, in the example a user password.

A trigger mechanism for the calculation of the OTP hash is required, that may be invoked either by the Operating System (OS) of the data processing terminal 11, 12, 13, and/or by a data processing application thereof, and/or even, through a relevant network connection, by a remote data processing application of a remote terminal network-connected to the data processing terminal 11 to which the USB memory stick 10 is locally connected. In one embodiment the OTP methodology used is the HOTP RFC 4226.

USB Flash devices accept SCSI command blocks which contain a function to be executed. Such functions can include standard Read Block and Write Block, as well as user-created non-standard functions. From the point of view of an operating system, the OS or data processing application running on the local or remote terminal calls the Read/Write or Device Input/Output Control (IOCTL) functions, which are translated by the OS into SCSI commands. The Read and Write functions are standard between all operating systems, whereas a device IOCTL function may not always conform to a standard (but may still be used). In the example, the method is implemented using the Read and Write functions.

The logical organisation of the file system (FAT, FAT32, etc) in the memory 20 of the memory stick 10 is performed by the operating system in the form of simple Reads and Writes of blocks of memory. Each of these blocks is 512 bytes in length and is called a Logical Block. Each data file written on the memory stick 10 starts at a Logical Block Address (LBA) assigned by the operating system.

The method relies upon the use of LBAs, and the trigger mechanism is such that, for a Read-Only OTP call, the OTP function is triggered when a specific LBA is read, whereas for a Write/Read OTP call, the OTP function is triggered when a code, for instance a user password, is written to a specific LBA. In the embodiment, the OTP hashing procedure reads the user password from the LBA written, and calculates the hash using both the user password and the shared counter. During the calculation of the OTP, the OTP hash is written to the LBA of a specific file. This allows the operating system to access the hash by normal reading of that file. When using a user password, it is written to that file and read by the OTP function, and the hash is written back to the same file.

Some operating systems are known to cache the data written to the USB device 10, thus reading back the same file may not always return the OTP hash, but the cached data previously written to the file. To overcome this limitation, the OTP hash may be written to the respective LBA of a further data file from which, as it has not previously been accessed by the operating system, the new OTP hash will be read correctly.

Internal NAND memory must be allocated for storing a shared counter for use with the above method. The storing of the OTP counter can be done in a single page of NAND memory, but this memory will be erased and rewritten every time a OTP is requested. To overcome this limitation, a wear levelling mechanism may be used, pursuant to which rewriting is accomplished by erasing the old block and allocating a new block, in which the new version is saved. Accordingly, this embodiment considers the implementation and use of a translation pointer to the current block. The OTP counter may also be stored in the LBA of a specific file, such that the default wear levelling function of the controller 40 may be used to save the OTP counter.

In order to initialise the USB memory stick 10 for operation according to the above, the USB memory stick 10 must first be configured with the shared counter and the user password, and the counter must be initialised to a known random value. The LBA of the counter, the password, and the further file are written within the standard NAND configuration data. The counter may be set by writing to the counter file. A flag is also included as to whether the counter may be overwritten or not, and allowing the counter file to be rewritten multiple times allows the memory stick 10 to be re-used for different authentication applications, and/or to improves the security provided by the method through resetting the private key at time intervals. As a further security measure, a limit may also included as to the number of times the OTP hash function can be called before the authentication method of the USB memory stick 10 is disabled.

It will be readily understood by the skilled person that protection must be put in place to disallow any and all access to the memory portion in which the counter is stored, except via the access route defined by the method. Thus, as the counter is stored as part of a normal data file, any access to the LBA of the counter is intercepted by the controller 40 and the returned data is cleared or nullified. Certain NAND controllers are known to include special IOCTLs designed for the reading and writing of internal memory, and the reading and writing of the NAND configuration. Should any of these functions be called after the USB memory stick 10 has been configured, the method may provide for erasing the counter and disabling the authentication method.

A practical implementation of the above method is described hereafter, using NAND memory and a CY7C68033 USB flash controller 40 made available by Cypress Semiconductors Corporation of San Jose, Calif., USA.

The USB memory stick 10 is initially formatted with a FAT32 file system under a Microsoft® Windows® operating system of a terminal 12 to which the stick is connected via the interface 30. Three files are written on the device, respectively called Code.dat, PasswordWrite.dat and PasswordRead.dat. Using the flash manufacturing tool made available by Cypress, the standard USB flash strings are updated, wherein one of the strings (eg. "SCSI device name") is edited to contain an alphanumerical string incorporating the respective LBA start of each of the three files in the file system. An example alphanumerical string may be "2004200C2008", when Code.dat starts at LBA 0x2004, PasswordWrite.dat starts at LBA 0x200C and PasswordRead.dat starts at LBA 0x2008. A private key is written to the Code.dat file, using normal operating system file calls.

When a request is received by the controller 40 to read from the LBA of the Code.dat file, the controller configured according to the method replies with 512 zeros, thus the private key is secured.

When a request is received by the controller 40 to write from the LBA of the PasswordWrite.dat file, the controller configured according to the method performs the One Time Password function and processes the OTP hash on the data to be written with the data in the Code.dat file. The resulting hash is written to the LBA of both the PasswordWrite.dat and the PasswordRead.dat files. The private OTP key is incremented by one and saved in the LBA of the Code.dat file.

When the PasswordRead.dat file is read by the operating system, the new hash is read from the LBA of the PasswordRead.dat file. Reading the PasswordWrite.dat file would also return the new hash, however most operating systems cache the write to the PasswordWrite.dat file and thus would return what was written instead of the calculated hash. The PasswordRead.dat file is not needed if the application can cause the operating system to read the unbuffered or non-cached PasswordWrite.dat file.

It will be readily understood by the skilled person that implementations of the above techniques may be varied in dependence upon ever-improving data processing capabilities of controllers 40. For instance, the inventors have readily envisaged such alternatives as a One Time Password with a clock device, which may be used without writing a password to the device 10 and only reading a file on the device 10, or the replacement of the One Time Password technique with a Public/Private Key Encryption and Signing technique. Known controllers 40 are not deemed capable of performing the amount of data processing required within a useful timeframe, however external chips could be used to assist with the required cryptographic processing.

In another embodiment of the invention whereby the data processing terminal Storage Device is write protected by default and after the OTP is read from the USB stick and a new OTP calculated, the next OTP is retrieved from a Central Server and sent to the USB memory stick by means of an IOCTL command or Write to a specific LBA. If the new OTP matches, the USB Memory stick is un-write-protected and a new OTP calculated. An example of this is the storing of medical information on a memory stick. By default the whole memory stick is write-protected, if a computer is authorized by some external means not relevant to this application to update the medical information it reads the OTP from the special file on the stick; submits it to the central server that house the OTP counter and if the OTP matches the central server sends back the next OTP Hash. This hash is passed to the memory stick by means of a user IOCTL command; if the hash matches the newly calculated hash on the memory stick, USB drive is un-write-protected and the application can now update the medical files. As soon as the memory stick is removed from that computer it defaults back to write protected.

In another embodiment it is envisaged that once a Web client is authenticated with a One Time Password (OTP) from the flash drive, the Web Client and the Web server then use the next OTP as the encryption key using a mechanism of encrypting HTML information. This method of encrypting HTML can be used from the Web Server to the Web Client and decrypted by the client using the second OTP as the password. The Client can automatically encrypted Form Input data using the same password and decrypted by the Web Server application.

It will be appreciated that the invention can have multiple Code/Password files and LBAs checked. This can allow the same USB memory stick to be use for multiple applications. In addition any number of Password Read files could be configured to activate the USB Sticks calculation of an OTP on the same Code file.

In a further embodiment of the invention in the Code file additional data may be stored such that the data is placed into the Password file along with the calculated OTP Hash. Thus when the Password file is read by the operating system it includes this additional data as well as the OTP hash. An example of this is when a Code File/Password File pair is initialized for use over the Internet to an on-line store or Credit Card Company; the user's credit-card details are encrypted with a random key and are placed in the additional data. The OTP Counter and the Random Encryption Key are stored on the on-line store's or Credit-Card company's central server. If a user wants to purchase something, the Password File associated with the store or credit-card is uploaded. The Password file contains an Identifier, the OTP Hash and the encrypted credit-card information. Using this information the store/CC Company validates the OTP Hash and ONLY if it matches, uses the stored encryption key to decode the Credit-Card details to complete the transaction. The on-line store never needs to keep the user's credit card details on file and thus a "hack" of the store does not allow the hackers to steal credit card information. The Credit-Card details are not entered by the user during the transaction and thus cannot be stolen by keyboard monitoring system. The contents of the Password file cannot be captured and replayed as the OTP Hash will have changed and thus the on-line store would reject the same file in a future transaction. Also the credit card details are encrypted and thus without the store's decryption key, useless.

Figure 4:
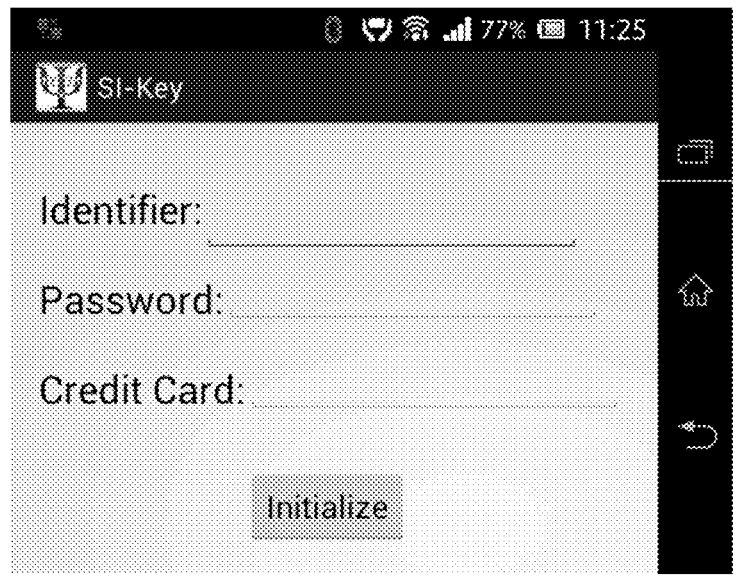
FIGS. 4 and 5 illustrates screen shot of the invention in operation according to one embodiment of the invention.
Figure 5:
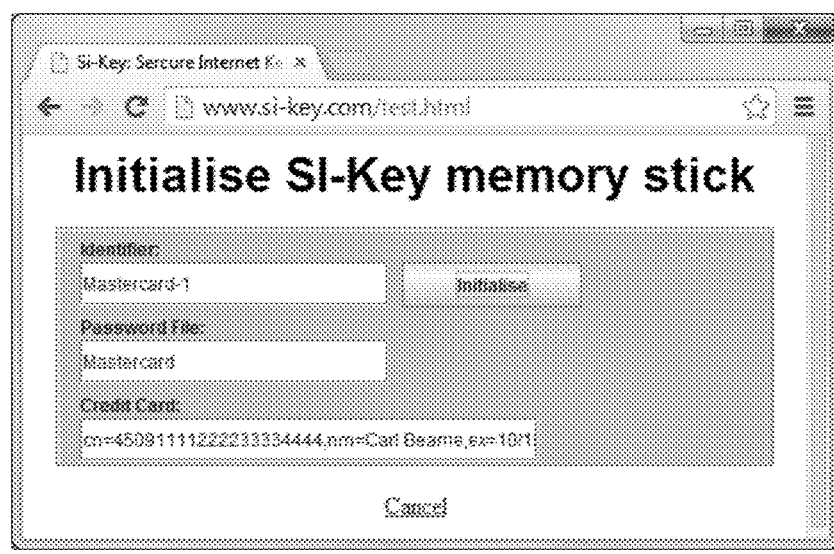

FIGS. 4 and 5 illustrates screen shot of the invention in operation according to one embodiment of the invention. On initialisation of the Code file, a user generated encryption key is sent to a Web site for example Paypal/Stripe or other financial transaction processing website. The encrypted Credit/Debit Card details & OTP counter are stored on the USB stick or other memory means. In order to effect a transaction with a sales Company the sales Company only stores the OTP counter and the encryption key, but not the Credit Card details. For a transaction, the OTP and the encrypted Credit Card details are uploaded in the one file. The Store validates the OTP and if correct and the user is correctly logged in, the Credit Card details are decrypted, used and discarded.

Figure 6A:
FIGS. 6A, 6B and 6C illustrate screen shots of the invention in operation according to one embodiment of the invention.
Figure 6B:
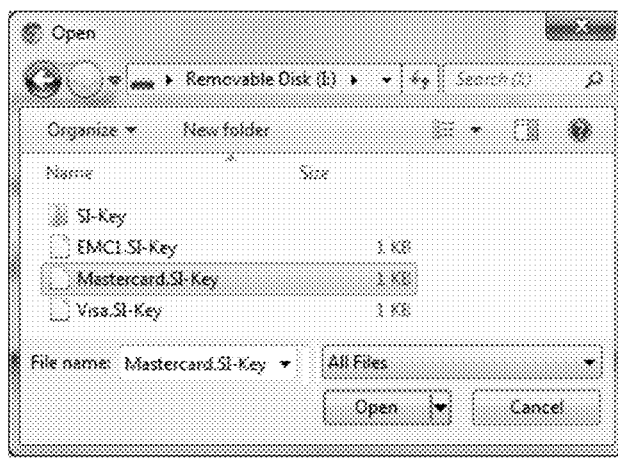
Figure 6C:

FIGS. 4 and 5 illustrates screen shot of the invention in operation according to one embodiment of the invention in a web based application. In FIGS. 6A and 6B using a Standard HTML File Form, a file is chosen and specifically selected to be uploaded. The OTP is verified by the Web Site and the Credit Card details can be decrypted as shown in FIG. 6C.

It will be appreciated that the invention can be implement in a number of ways, for example a generic memory stick can be processed that contains 10 Code/Password files that can be initialised at anytime using a Web based java applet. Web sites could offer access via to the system as an option. A Write-Once option can be provided where a single code used by a specific company to send out preconfigured drives (eg. a bank). A Read-Only memory stick can be provided where a single code with a write-protected drive but specific computers can be designated as having write access to the drive via the OTP, for example an Emergency Medical Record updatable only on a specific PC.

The embodiments in the invention described with reference to the drawings comprise a portable-computer-readable-medium and processes performed upon a portable-computer-readable-medium with a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method of configuring a controller of a portable-computer-readable-medium for performing a cryptographic function, comprising the steps of
storing at least first and second data files in memory means of the medium, each file starting at a respective Logical Block Address (LBA) of the memory means, as a first LBA and a second LBA respectively;
writing a first code in the first data file and writing a second code in the second data file; and
configuring the controller to perform a hash function upon input data to be written to the second data file with the first code, write an output hash to at least the second LBA, increment the first code and write the incremented first code to the first LBA.

2. A method according to claim 1, comprising the further step of
storing a third data file in the memory means, the third data file starting at a respective Logical block (LBA) address of the memory means as a third LBA; and
further configuring the controller to write the output hash to the third LBA.

3. A method according to claim 2, comprising the further step of wear-levelling the memory means in use.

4. A method according to claim 1, wherein the method comprises a further step of, for any request received by the controller to read the memory means from the first LBA, returning either blank or random data.

5. A method according to claim 1, comprising a further step of configuring the controller to process only a standard read or write request and to block any other medium input/output control (IOCTL) request.

6. A method according to claim 1, comprising a further step of configuring the controller to disable the cryptographic functions of the portable-computer-readable-medium after a pre-determined number of correct or incorrect attempts at preforming the cryptographic function.

7. A method according to claim 1, wherein the first code is a private key and the second code is a password.

8. A method according to claim 1, wherein the portable-computer-readable-medium is selected from a group comprising random access memory devices, non-volatile random access memory devices, flash memory devices, electrically-erasable programmable read-only memory devices, optical data storage devices, magnetic data storage devices and networked data storage arrays and portions thereof.

9. A non-transitory portable-computer-readable-medium comprising memory means for storing data files,
at least one data input/output interface for interfacing the portable-computer-readable-medium with a data processing terminal; and
a controller, operably connected to the memory means and to the at least one data input/output interface;
wherein the memory means stores at least first and second data files, each file starting at a respective Logical Block Address (LBA) of the memory means as a first LBA and a second LBA respectively, wherein the first data file includes a first code and the second data file includes a second code; and
wherein the controller comprises hashing means for hashing input data to be written to the second file with the first code, means for incrementing the first code after hashing, and writing means for writing a hash output by the hashing means to at least the second LBA and writing the incremented first code to the first LBA.

10. A non-transitory portable-computer-readable-medium according to claim 9, wherein the memory means stores a third data file in the memory means, the third data file starting at a respective Logical block (LBA) address of the memory means as a third LBA; and wherein the writing means is further for writing the hash output by the hashing means to at least the third LBA.

11. A non-transitory portable-computer-readable-medium according to claim 9, wherein the memory means stores a third data file in the memory means, the third data file starting at a respective Logical block (LBA) address of the memory means as a third LBA; and wherein the writing means is further for writing the hash output by the hashing means to at least the third LBA and wherein the controller is adapted to perform a wear-levelling function upon the memory means.

12. A non-transitory portable-computer-readable-medium according to claim 9, wherein the first code is a private key and the second code is a password.

13. A non-transitory portable-computer-readable-medium according to claim 9, wherein the portable-computer-readable-medium is selected from a group comprising random access memory devices, non-volatile random access memory devices, flash memory devices, electrically-erasable programmable read-only memory devices, optical data storage devices, magnetic data storage devices and networked data storage arrays and portions thereof.

14. A non-transitory portable-computer-readable-medium according to claim 13, wherein the memory means is a NAND memory.

15. A non-transitory portable-computer-readable-medium comprising a set of instructions recorded on a data carrying medium storing at least first and second data files in memory means of the medium, each file starting at a respective Logical Block Address (LBA) of the memory means as a first LBA and a second LBA respectively, wherein the set of instructions, when processed by a controller of the data carrying medium, configures the controller to write a first code in the first file;

perform a hash function upon input data to be written to the second file with the first code;

write an output hash to at least the second LBA;

increment the first code; and write the incremented first code to the first LBA.

16. A non-transitory portable-computer-readable-medium comprising a set of instructions according to claim 15, wherein the memory means stores a third data file in the memory means, the third file starting at a respective Logical block (LBA) address of the memory means as a third LBA, further configuring the controller to write the hash output by the hashing means to at least the third LBA.

17. A non-transitory portable-computer-readable-medium comprising a set of instructions according to claim 15, wherein the memory means stores a third data file in the memory means, the third file starting at a respective Logical block (LBA) address of the memory means as a third LBA, further configuring the controller to write the hash output by the hashing means to at least the third LBA and further configuring the controller to perform a wear-levelling function upon the memory means.

18. A non-transitory portable-computer-readable-medium comprising a set of instructions according to claim 15, wherein the set of instructions are embodied as firmware for the controller of the data carrying medium.

\* \* \* \* \*